United States Patent
Gokan et al.

(10) Patent No.: US 9,744,915 B2
(45) Date of Patent: Aug. 29, 2017

(54) TRAVEL CONTROL DEVICE AND TRAVEL CONTROL METHOD

(71) Applicant: NISSAN MOTOR CO., LTD., Kanagawa (JP)

(72) Inventors: Toshimichi Gokan, Machida (JP); Takeshi Sugano, Yokohama (JP); Masahiro Kobayashi, Novi, MI (US); Takeshi Yonezawa, Odawara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 390 days.

(21) Appl. No.: 14/380,808

(22) PCT Filed: Feb. 19, 2013

(86) PCT No.: PCT/JP2013/053994
§ 371 (c)(1),
(2) Date: Aug. 25, 2014

(87) PCT Pub. No.: WO2013/129184
PCT Pub. Date: Sep. 6, 2013

(65) Prior Publication Data
US 2015/0015714 A1    Jan. 15, 2015

(30) Foreign Application Priority Data
Feb. 27, 2012   (JP) .................... 2012-040284

(51) Int. Cl.
*H04N 7/18*     (2006.01)
*B60R 11/04*    (2006.01)
(Continued)

(52) U.S. Cl.
CPC ........... *B60R 11/04* (2013.01); *B60W 30/095* (2013.01); *B60W 50/14* (2013.01); *G08G 1/165* (2013.01);
(Continued)

(58) Field of Classification Search
None
See application file for complete search history.

(56) References Cited

U.S. PATENT DOCUMENTS

2007/0146164 A1* 6/2007 Schmid .................. G08G 1/161
340/932.2
2012/0327239 A1  12/2012 Inoue et al.

FOREIGN PATENT DOCUMENTS

JP   2004330898 A    11/2004
JP   2009280109 A    12/2009
(Continued)

OTHER PUBLICATIONS

Communication and extended European search report, dated Feb. 25, 2015, from the corresponding European Patent Application No. 13754065.4.

*Primary Examiner* — James M Anderson, II
(74) *Attorney, Agent, or Firm* — Young Basile Hanlon & McFarlane, P.C.

(57) ABSTRACT

A travel control device includes ultrasonic obstacle detection sensors detecting an obstacle entering a rear side of a vehicle and a distance to the obstacle, and an image obstacle detection unit detecting the obstacle entering the rear side of the vehicle by using an image of the rear side. If a distance to the obstacle detected by the sensors is equal to or less than an activation threshold for warning, the travel control device issues a warning, and sets the activation threshold larger as the vehicle speed of the vehicle becomes high. If the vehicle is detected preparing to move rearward and the image obstacle detection unit detects the obstacle, the travel control device sets the activation threshold to a constant value regardless of the vehicle speed.

8 Claims, 9 Drawing Sheets

(51) Int. Cl.
  *G08G 1/16* (2006.01)
  *H04N 5/228* (2006.01)
  *B60W 50/14* (2012.01)
  *B60W 30/095* (2012.01)

(52) U.S. Cl.
  CPC ............ *G08G 1/166* (2013.01); *H04N 5/228* (2013.01); *H04N 7/183* (2013.01); *B60K 2350/1096* (2013.01); *B60W 2050/143* (2013.01); *B60W 2520/10* (2013.01); *B60W 2550/10* (2013.01)

(56) References Cited

FOREIGN PATENT DOCUMENTS

| | | |
|---|---|---|
| JP | 2012018613 A | 1/2012 |
| WO | 2011145141 A1 | 11/2011 |

* cited by examiner

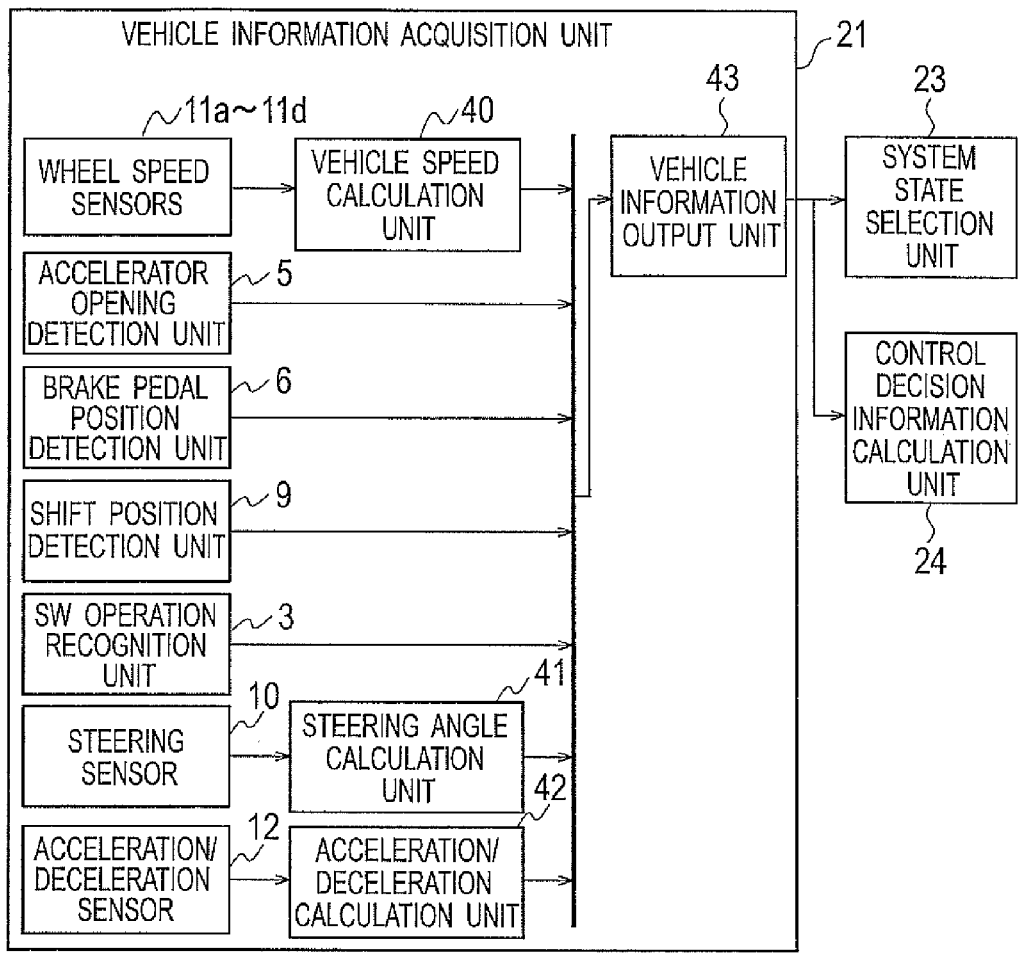
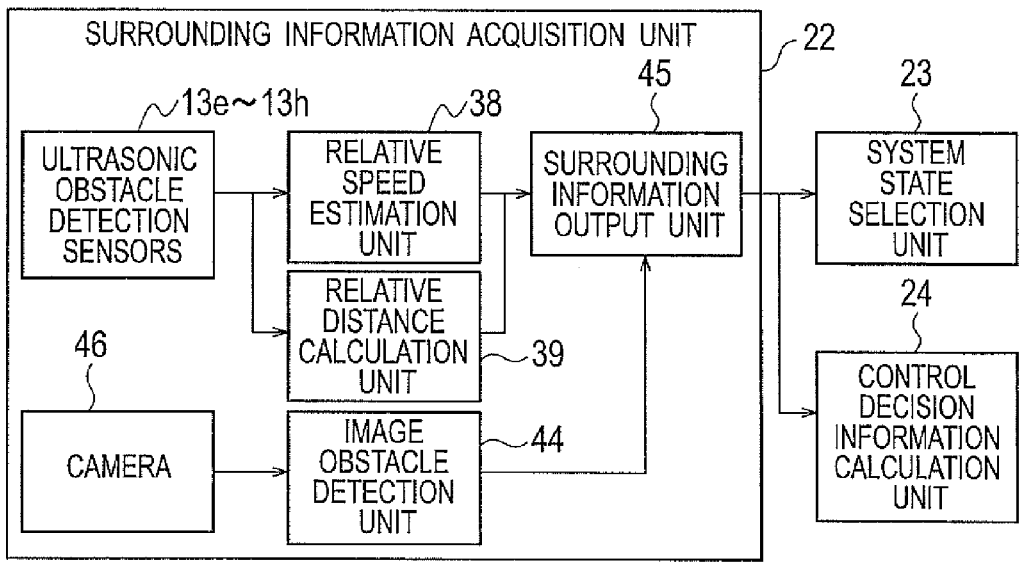

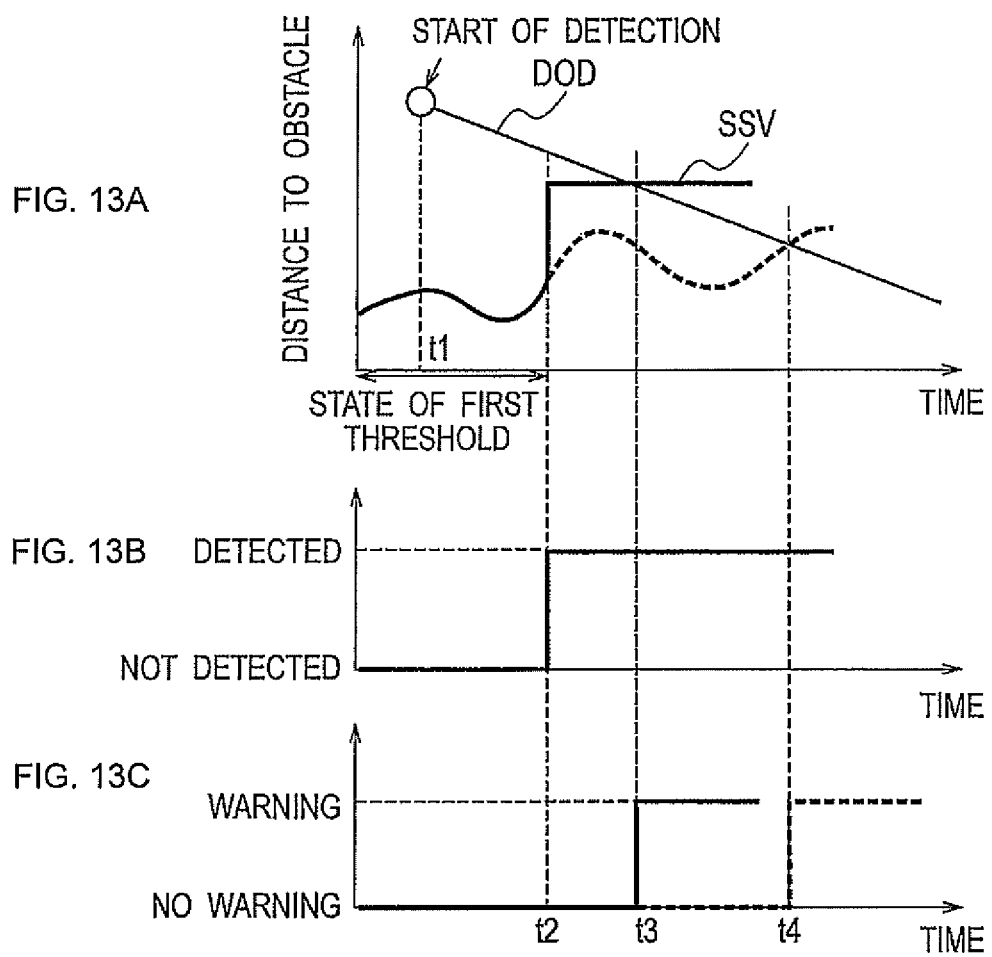

TRAVEL CONTROL DEVICE AND TRAVEL CONTROL METHOD

CROSS REFERENCE TO RELATED APPLICATION

The present application claims priority to Japanese Patent Applications No. 2012-040284 filed on Feb. 27, 2012, incorporated herein in its entirety.

TECHNICAL FIELD

The present invention relates to a travel control device and a travel control method.

BACKGROUND

A technique for a vehicle to detect an obstacle approaching the surroundings of the vehicle by using an obstacle sensor mounted on the vehicle has heretofore been known. For example, in Japanese Patent Application Publication No. 2009-280109, in order to detect a slight shock or a burglary and record it as a video image when a vehicle is parked or stopped, shooting of an obstacle by an on-vehicle camera and recording of its video image are started in response to detection of the obstacle by an ultrasonic sensor.

SUMMARY

In Japanese Patent Application Publication No. 2009-280109, however, when the obstacle detected by the ultrasonic sensor is judged as being within a preset distance, only the shooting of the obstacle by the on-vehicle camera and recording of its video image are started. Thus, an alarm indicating the degree of risk of the detected obstacle cannot be given to a driver.

The present invention has been made in view of the foregoing problem. An object of the present invention is to provide a travel control device and a travel control method which give a driver an alarm indicating the degree of risk of an obstacle, by changing the timing of warning according to the degree of risk of the obstacle.

A travel control device according to a first aspect of the present invention includes an ultrasonic obstacle detection unit, an image capture unit, an image obstacle detection unit, a rearward movement preparation detection unit, a warning unit, a warning control unit, and a threshold control unit. The ultrasonic obstacle detection unit detects an obstacle entering a rear side of a vehicle and a distance to the obstacle by using ultrasonic waves. The image capture unit captures an image of a range including the rear side of the vehicle. The image obstacle detection unit detects the obstacle entering the rear side of the vehicle by using the image captured by the image capture unit. The rearward movement preparation detection unit detects the vehicle preparing to move rearward. The warning unit issues a warning about the obstacle detected by the ultrasonic obstacle detection unit. The warning control unit controls the warning unit so that the warning is issued if the distance to the obstacle detected by the ultrasonic obstacle detection unit is equal to or less than an activation threshold for warning. The threshold control unit controls the activation threshold according to the vehicle speed of the vehicle so that the higher the vehicle speed of the vehicle, the larger the activation threshold. If the rearward movement preparation detection unit detects the vehicle preparing to move rearward and the image obstacle detection unit detects the obstacle, the threshold control unit performs control to set the activation threshold to a constant value regardless of the vehicle speed of the vehicle so as to make the warning more likely to be issued than when controlling the activation threshold according to the vehicle speed of the vehicle.

A travel control method according to a second aspect of the present invention using a travel control device including the ultrasonic obstacle detection unit, the image capture unit, the image obstacle detection unit, the rearward movement preparation detection unit, and the warning unit, includes controlling the warning unit so that the a warning is issued if the distance to the obstacle detected by the ultrasonic obstacle detection unit is equal to or less than an activation threshold for warning; controlling the activation threshold according to the vehicle speed of the vehicle so that the higher the vehicle speed of the vehicle, the larger the activation threshold; and performing control to set the activation threshold to a constant value regardless of the vehicle speed of the vehicle so as to make the warning more likely to be issued than when controlling the activation threshold according to the vehicle speed of the vehicle, if the rearward movement preparation detection unit detects the vehicle preparing to move rearward and the image obstacle detection unit detects the obstacle.

BRIEF DESCRIPTION OF DRAWINGS

FIG. 3 is a block diagram illustrating a specific example of a configuration of a vehicle information acquisition unit 21 of FIG. 2.

FIG. 4 is a block diagram illustrating a specific example of a configuration of a surrounding information acquisition unit 22 of FIG. 2.

FIG. 13A is a graph showing an example of an activation threshold SSV and a distance DOD to the obstacle detected by the ultrasonic obstacle detection sensors 13*e* to 13*h*, which vary with the passage of time; FIG. 13B is a graph showing an example of the detection state of the obstacle by the image obstacle detection unit 44; and FIG. 13C is a graph showing an example of the decision state on whether or not a warning unit is to issue a warning of the approach of the obstacle.

DESCRIPTION OF EMBODIMENTS

Figure 1:
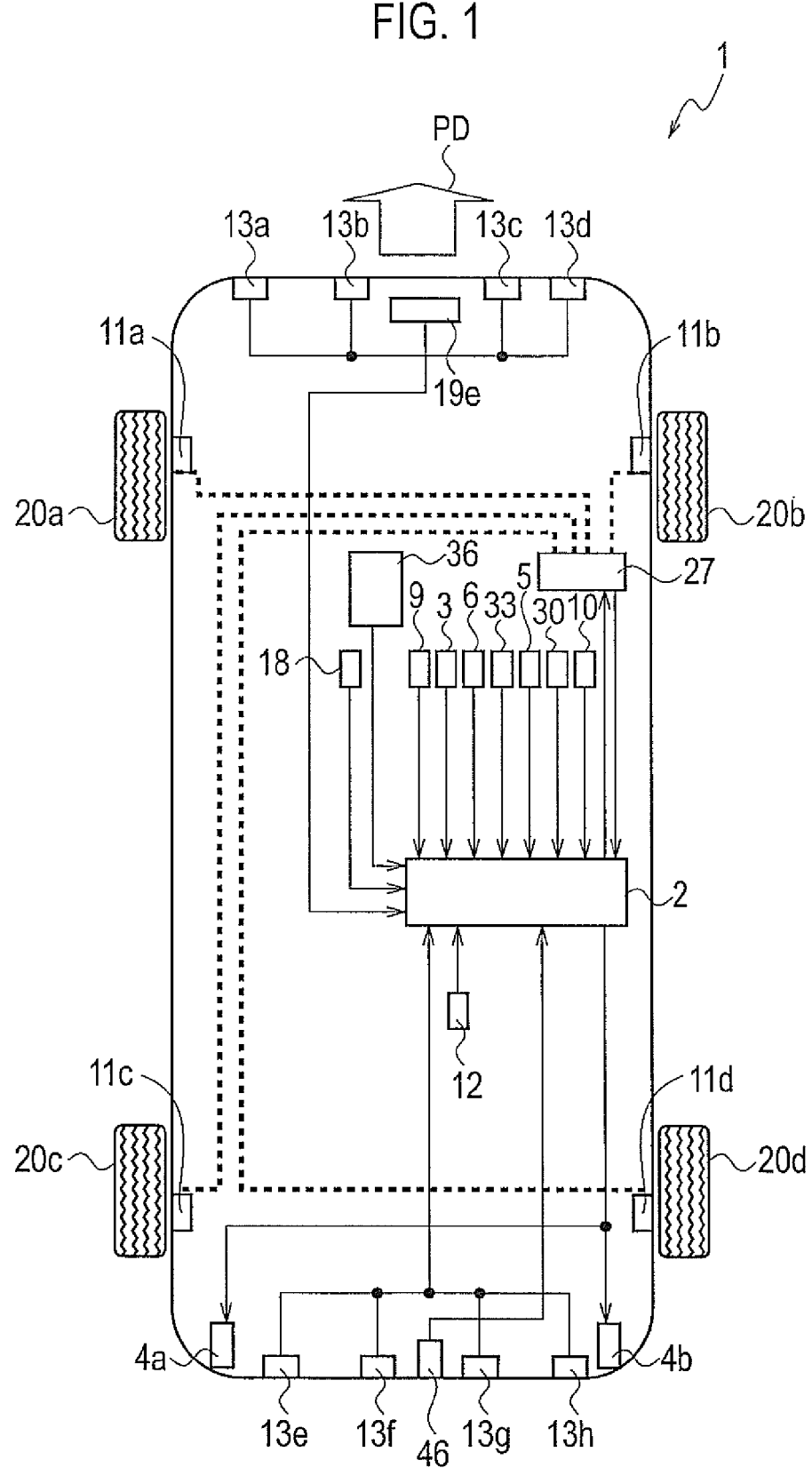
FIG. 1 is a schematic view illustrating an example of a vehicle layout of a travel control device according to an embodiment.

An embodiment of the present invention will be described below with reference to the drawings. In the disclosures of the drawings, the same portions are designated by the same reference characters.

Description will be given with reference to FIG. 1 with regard to an example of a vehicle layout of a travel control device according to an embodiment. A vehicle 1 is mounted with brake lamps 4*a*, 4*b*, an ignition switch 18 which provides commands to start and stop a driving force generation device including an engine and a motor, front obstacle detection sensors 13*a* to 13*d*, 19*e* which detect an obstacle approaching a front side PD of the vehicle 1, plural ultrasonic obstacle detection sensors 13*e* to 13*h* as ultrasonic obstacle detection units which detect an obstacle approaching a rear side of the vehicle 1 and a distance to the obstacle by using ultrasonic waves, a camera 46 (or an image capture unit) which captures an image of a range including the rear side of the vehicle 1, a driving force generation device 36 which generates a driving force for the vehicle, a braking force generation device 27, an accelerator pedal manipulation reaction force generation device 30, an alarm device 33 which alerts a driver that an obstacle is approaching, and a vehicle control device 2 which controls the overall vehicle 1.

The front obstacle detection sensors 13*a* to 13*d* are installed for example in a front bumper of the vehicle 1, and the ultrasonic obstacle detection sensors 13*e* to 13*h* and a camera 46 are installed for example in a rear bumper of the vehicle 1. Sonar detectors which use ultrasonic waves to detect an obstacle entering a region relatively in the vicinity of the vehicle 1 and a distance to the obstacle can be used as the front obstacle detection sensors 13*a* to 13*d* and the ultrasonic obstacle detection sensors 13*e* to 13*h*. The front obstacle detection sensor 19*e* is installed for example in the front bumper of the vehicle 1. Radar detectors which use electromagnetic waves to detect an obstacle entering a region relatively far away from the vehicle 1 can be used as the front obstacle detection sensor 19*e*. The vehicle control device 2 is configured by a processing unit such as an ECU (Engine Control Unit), and a CPU (Central Processing Unit) in the processing unit executes a previously stored computer program thereby to control operation of the overall vehicle 1.

A configuration of the travel control device according to the embodiment will be described with reference to FIG. 2. The travel control device according to the embodiment includes a vehicle information acquisition unit 21 which acquires information on the vehicle 1, a surrounding information acquisition unit 22 which acquires information on the surroundings of the vehicle, a system state selection unit 23, a control decision information calculation unit 24, and a warning device which issues a warning to an obstacle detected by the surrounding information acquisition unit 22. Here, the warning device includes a braking force generation system (25 to 27) which generates a braking force to give the warning of the approach of the obstacle, an accelerator pedal manipulation reaction force generation system (28 to 30) which generates an accelerator pedal manipulation reaction force to give the warning of the approach of the obstacle, an alarm system (31 to 33) which gives an alarm to the driver to give the warning of the approach of the obstacle, and a driving force control system (34 to 36) which performs driving force control to give the warning of the approach of the obstacle.

As illustrated in FIG. 3, the vehicle information acquisition unit 21 includes wheel speed sensors 11*a* to 11*d* installed on wheels 20*a* to 20*d*, respectively, of the vehicle 1, an accelerator opening detection unit 5 installed on an accelerator pedal of the vehicle 1, a brake pedal position detection unit 6 which detects the position of a brake pedal of the vehicle 1, a shift position detection unit 9 (or a rearward movement preparation detection unit) which detects the shift position of the vehicle 1, an SW operation recognition unit 3 which detects the state of an on-off switch for the travel control device, a steering sensor 10 which detects a steering angle of a steering wheel of the vehicle 1, and an acceleration/deceleration sensor 12 which detects acceleration or deceleration of the vehicle 1.

The wheel speed sensors 11*a* to 1*d* detect rotation speeds of the wheels 20*a* to 20*d*, respectively, of the vehicle 1. A vehicle speed calculation unit 40 calculates a vehicle speed (or a wheel speed) from the rotation speeds of the wheels 20*a* to 20*d*, taking into account a radius of rotation of the wheels 20*a* to 20*d*. Further, the vehicle speed calculation unit 40 calculates a travel distance by integrating the vehicle speed. The brake pedal position detection unit 6 detects whether or not the driver is depressing the brake pedal, and detects the amount of depression of the brake pedal. The shift position detection unit 9 detects the state of the shift position in order to detect the present state of a transmission. An example of detection of the vehicle 1 preparing to move rearward includes detection of a rearward movement (R) position by the shift position detection unit 9. The SW operation recognition unit 3 detects the switch state of the travel control device and the switch state of the ignition switch 18. A steering angle calculation unit 41 performs filtering processing on the steering angle of the steering wheel detected by the steering sensor 10, as needed. An acceleration/deceleration calculation unit 42 performs filtering processing on the acceleration or deceleration of the vehicle 1 detected by the acceleration/deceleration sensor 12, as needed. A vehicle information output unit 43 transfers the wheel speed of the vehicle 1, an accelerator opening, the position of the brake pedal, the shift position, the state of the on-off switch for the travel control device, the steering angle of the steering wheel and the acceleration or deceleration, as vehicle information, to the system state selection unit 23 or the control decision information calculation unit 24. The vehicle speed calculation unit 40, the steering angle calculation unit 41, the acceleration/deceleration calculation unit 42 and the vehicle information output unit 43 can be configured as a portion of the vehicle control device 2 of FIG. 1. Of course, a processing unit which is different from the vehicle control device 2 is prepared, and a CPU in the processing unit executes a previously stored computer program. This may implement operation of the vehicle speed calculation unit 40, the steering angle calculation unit 41, the acceleration/deceleration calculation unit 42 and the vehicle information output unit 43.

A detailed example of a configuration of the surrounding information acquisition unit 22 will be described with reference to FIG. 4. The surrounding information acquisition unit 22 includes, at least, the ultrasonic obstacle detection sensors 13*e* to 13*h*, and the camera 46 (or the image capture unit) which captures the image of the range including the rear side of the vehicle 1. A relative distance calculation unit 39 performs filtering processing on a value of a distance from the obstacle detected by the ultrasonic obstacle detection sensors 13e to 13h, as needed. A relative speed estimation unit 38 estimates a speed relative to the obstacle from the distance to the obstacle. The sign of the relative speed is such that a positive sign indicates a direction in which the obstacle approaches the vehicle 1 and a negative sign indicates a direction in which the obstacle moves away from the vehicle 1. Further, the relative speed estimation unit 38 calculates the time (or approach time) required for the obstacle to approach the vehicle 1 from the distance to the obstacle detected by the ultrasonic obstacle detection sensors 13e to 13h and the relative speed. The approach time may be determined for example by obtaining TTC (Time-To-Collision) by dividing the distance to the obstacle by the relative speed. An image obstacle detection unit 44 detects the obstacle approaching the rear side of the vehicle 1 and the distance to the obstacle by using the image captured by the camera 46. Besides, the surrounding information acquisition unit 22 includes a processing device (unillustrated) which processes results sensed by the front obstacle detection sensors 13a to 13d, 19e installed in a front portion of the vehicle 1 illustrated in FIG. 1. A surrounding information output unit 45 transfers the presence or absence of a possible obstacle which may be present at the front side PD and the rear side of the vehicle 1, the distance to the obstacle and the relative speed, and the approach time and a direction or angle of detection of the obstacle to be described later, as surrounding information, to the system state selection unit 23 or the control decision information calculation unit 24. The relative distance calculation unit 39, the relative speed estimation unit 38, the image obstacle detection unit 44 and the surrounding information output unit 45 can be configured as a portion of the vehicle control device 2 of FIG. 1. Of course, a processing unit which is different from the vehicle control device 2 is prepared, and a CPU in the processing unit executes a previously stored computer program. This may implement operation of the relative distance calculation unit 39, the relative speed estimation unit 38, the image obstacle detection unit 44 and the surrounding information output unit 45.

The system state selection unit 23 determines whether to set the system state to the on or off state, based on the state of the on-off switch for the travel control device detected by the SW operation recognition unit 3.

Figure 6:
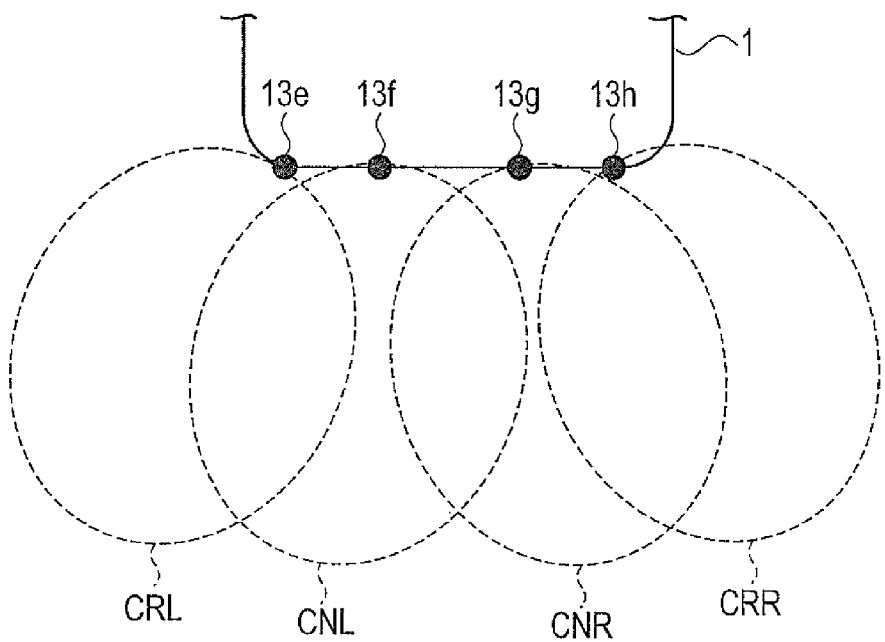
FIG. 6 is a plan view illustrating ultrasonic detection ranges CRL, CNL, CNR, CRR in which ultrasonic obstacle detection sensors 13e to 13h can detect an obstacle, respectively.

Description will be given with reference to FIG. 6 with regard to ultrasonic detection ranges CRL, CNL, CNR, CRR in which the ultrasonic obstacle detection sensors 13e to 13h can detect the obstacle, respectively. The ultrasonic obstacle detection sensors 13e to 13h as the ultrasonic obstacle detection units are formed of, at least, the sensors 13f, 13g installed in a central portion of a rear portion of the vehicle 1, the sensor 13e installed in a left-hand portion of the rear portion of the vehicle 1, and the sensor 13h installed in a right-hand portion of the rear portion of the vehicle 1. In the embodiment, the two ultrasonic obstacle detection sensors 13f, 13g are installed in the central portion, as illustrated by way of example; however, only one sensor may be installed in the central portion.

The ultrasonic obstacle detection sensors 13e to 13h can detect the obstacle entering the ultrasonic detection ranges CRL, CNL, CNR, CRR, respectively, extending rearward from the rear bumper of the vehicle 1, and the distance to the obstacle. The ultrasonic detection ranges CNL, CNR are formed in regions including the central portion of the rear portion of the vehicle 1, and the ultrasonic detection ranges CRL, CRR are formed in regions adjacent to the ultrasonic detection ranges CNL, CNR, respectively, on both sides thereof. The ultrasonic obstacle detection sensors 13e to 13h are in a one-to-one correspondence with the ultrasonic detection ranges CRL, CNL, CNR, CRR. The adjacent ultrasonic detection ranges CRL, CNL, CNR, CRR partially overlap one another.

Figure 7:
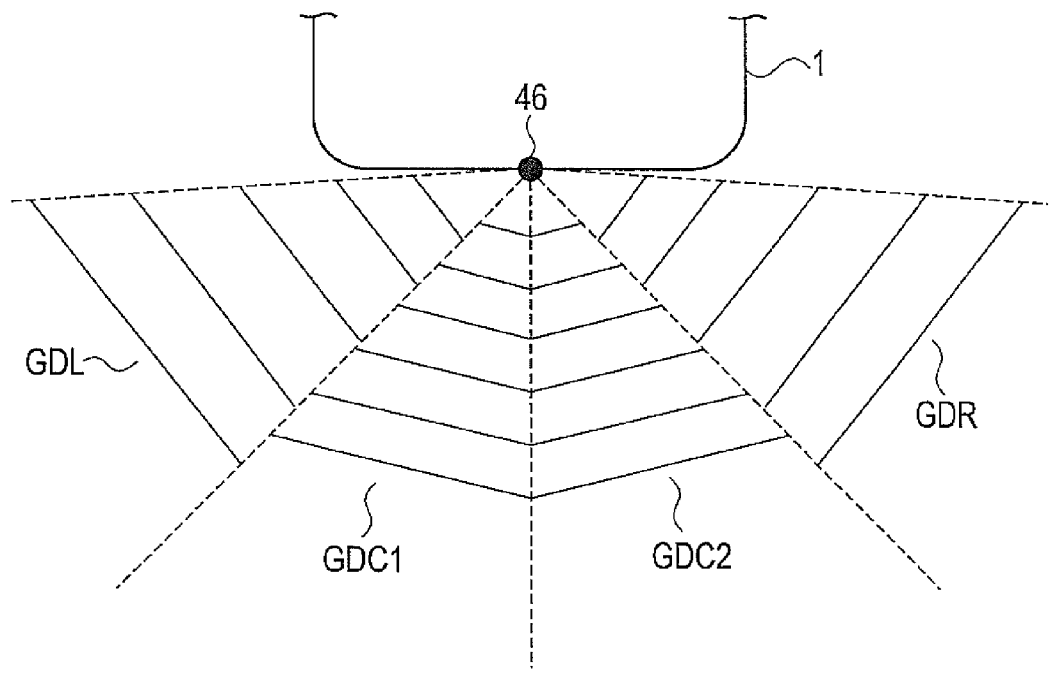
FIG. 7 is a plan view illustrating detection angle areas GDL, GDC1, GDC2, GDR in which an image obstacle detection unit 44 can detect the obstacle.

Description will be given with reference to FIG. 7 with regard to detection angle areas GDL, GDC1, GDC2, GDR in which the obstacle can be detected by using the camera 46. The detection angle areas GDL, GDC1, GDC2, GDR are areas in which the image obstacle detection unit 44 can detect the obstacle by using the image taken by the camera 46. The image obstacle detection unit 44 divides the range including the rear side of the vehicle 1 into the plural detection angle areas GDL, GDC1, GDC2, GDR, and detects the obstacle entering the rear side of the vehicle 1, for each of the detection angle areas, based on edge information on the image. In other words, the image obstacle detection unit 44 can determine the obstacle entering the rear side of the vehicle 1, the distance to the obstacle, and the detection angle areas GDL, GDC1, GDC2, GDR which the obstacle enters.

The image obstacle detection unit 44 divides the range into the plural detection angle areas including, at least, the rear side detection angle area (GDC1, GDC2) including the rear side of the vehicle 1, and the left side detection angle area GDL and the right side detection angle area GDR adjacent to the rear side detection angle area on both sides thereof. In the embodiment, description will be given with regard to a case where the rear side detection angle area including the rear side of the vehicle 1 is subdivided into the two areas GDC1, GDC2; however, the rear side detection angle area is not necessarily limited to being divided into the two areas GDC1, GDC2.

Figure 5:
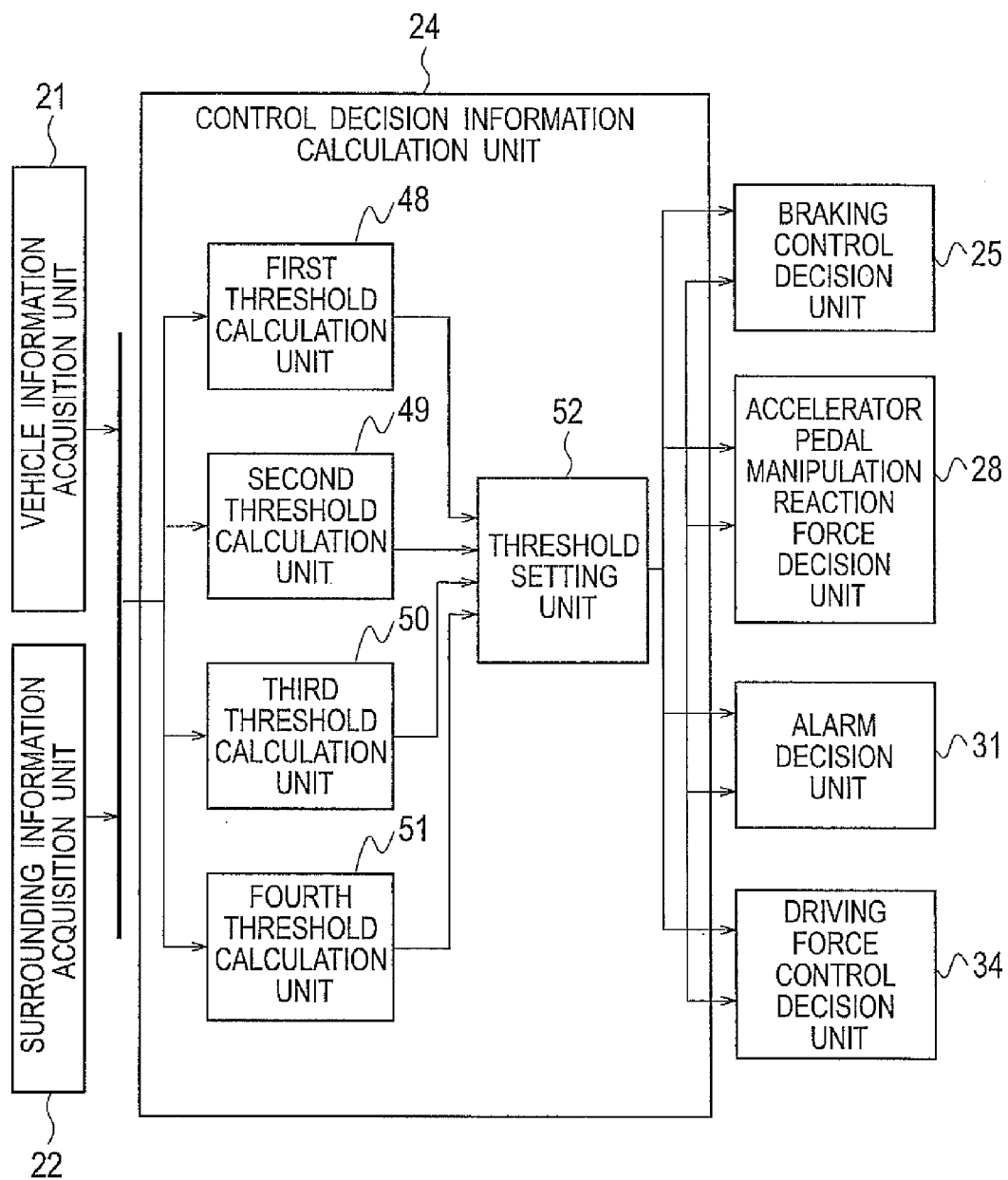
FIG. 5 is a block diagram illustrating a specific example of a configuration of a control decision information calculation unit 24 of FIG. 2.

A specific example of a configuration of the control decision information calculation unit 24 of FIG. 2 will be described with reference to FIG. 5. The control decision information calculation unit 24 includes a first threshold calculation unit 48 which calculates a first threshold as a criterion of decision of warning, a second threshold calculation unit 49 which calculates a second threshold as a criterion of decision of warning, a third threshold calculation unit 50 which calculates a third threshold as a criterion of decision of warning, a fourth threshold calculation unit 51 which calculates a fourth threshold as a criterion of decision of warning, and a threshold setting unit 52 (or a threshold control unit) which selects an activation threshold from among the first to fourth thresholds. The activation threshold selected by the threshold setting unit 52 is transmitted to a braking control decision unit 25, an accelerator pedal manipulation reaction force decision unit 28, an alarm decision unit 31, and a driving force control decision unit 34.

Figure 8:
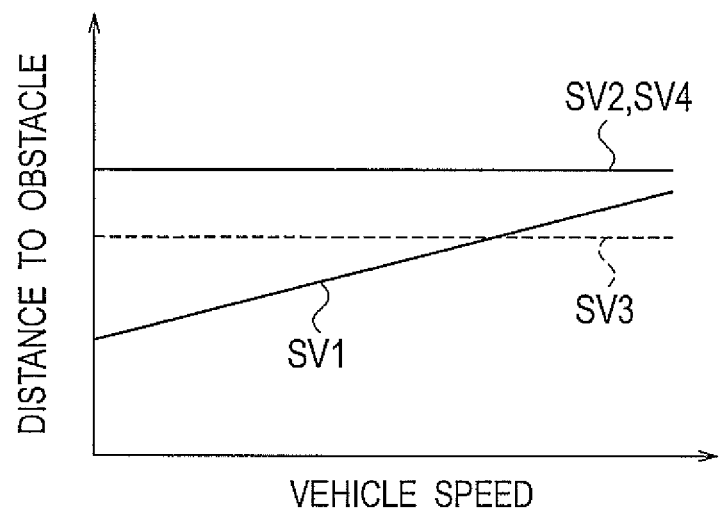
FIG. 8 is a graph showing an example of a relationship between a vehicle speed and first to fourth thresholds SV1 to S4 calculated by first to fourth threshold calculation units 48 to 51, respectively.

As illustrated in FIG. 8, a first threshold SV1 calculated by the first threshold calculation unit 48 varies according to the vehicle speed. Specifically, the higher the vehicle speed of the vehicle 1, the larger the first threshold SV1. When the vehicle speed is equal to 0, the first threshold SV1 may be offset to take on a predetermined value. The first threshold calculation unit 48 calculates the first threshold SV1 for each of the ultrasonic obstacle detection sensors 13e to 13h. Also, the first threshold calculation unit 48 may change the first threshold SV1 according to the approach time calculated by the relative speed estimation unit 38. Further, the first threshold calculation unit 48 may change the first threshold SV1 based on the acceleration of the vehicle 1 detected by the acceleration/deceleration sensor 12 or the steering angle detected by the steering sensor 10.

If the image obstacle detection unit 44 detects the obstacle approaching the rear side of the vehicle 1, the second threshold calculation unit 49 calculates as the second threshold a constant value SV2 (for example, 1.5 m) not depending on the vehicle speed, as illustrated in FIG. 8. If the image obstacle detection unit 44 does not detect the obstacle approaching the rear side of the vehicle 1, the second threshold calculation unit 49 sets the second threshold to 0.

If the image obstacle detection unit 44 detects the obstacle approaching the rear side of the vehicle 1, the third threshold calculation unit 50 calculates as the third threshold a constant value SV3 (for example, 1.0 m) not depending on the vehicle speed, as illustrated in FIG. 8. If the image obstacle detection unit 44 does not detect the obstacle approaching the rear side of the vehicle 1, the third threshold calculation unit 50 sets the third threshold to 0.

If the image obstacle detection unit 44 detects the obstacle approaching the rear side of the vehicle 1, the fourth threshold calculation unit 51 calculates as the fourth threshold a constant value SV4 (for example, 1.5 m) not depending on the vehicle speed, as illustrated in FIG. 8. If the image obstacle detection unit 44 does not detect the obstacle approaching the rear side of the vehicle 1, the fourth threshold calculation unit 51 sets the fourth threshold to 0.

If the shift position detection unit 9 detects the rearward movement position and the image obstacle detection unit 44 detects the obstacle, the threshold setting unit 52 controls the activation threshold to a constant value, namely, either the second threshold SV2, the third threshold SV3, or the fourth threshold SV4, regardless of the vehicle speed of the vehicle 1.

Meanwhile, if the shift position detection unit 9 does not detect the rearward movement position, or if the image obstacle detection unit 44 does not detect the obstacle, the threshold setting unit 52 selects the first threshold SV1 as the activation threshold. Thereby, the threshold setting unit 52 can control the activation threshold so that the higher the vehicle speed of the vehicle 1, the larger the activation threshold.

Detailed description will be given with regard to a case where the activation threshold is controlled to the constant value (SV2 to SV4). The threshold setting unit 52 changes the activation threshold according to the detection angle area GDC1, GDC2, GDL or GDR in which the obstacle is detected. Specifically, if the obstacle is detected in the left side detection angle area GDL or the right side detection angle area GDR, the threshold setting unit 52 selects the second threshold SV2 (for example, 1.5 m) as the activation threshold. If the obstacle is detected in the rear side detection angle area GDC1 or GDC2 without being detected in the left side detection angle area GDL and the right side detection angle area GDR, the threshold setting unit 52 selects the third threshold SV3 (for example, 1.0 m) as the activation threshold. If, within a predetermined time (for example, 3 seconds), the obstacle is detected in the left side detection angle area GDL and is detected in the rear side detection angle area GDC1, or if, within the predetermined time, the obstacle is detected in the right side detection angle area GDR and is detected in the rear side detection angle area GDC2, the threshold setting unit 52 selects the fourth threshold SV4 (for example, 1.5 m) as the activation threshold.

Thus, if the image obstacle detection unit 44 detects the obstacle in the left side detection angle area GDL or the right side detection angle area GDR, the threshold setting unit 52 sets the activation threshold larger than when the obstacle is detected in the rear side detection angle area GDC1 or GDC2. Thereby, the timing of warning, when the obstacle is detected on the left and right sides, can become earlier than when the obstacle is detected just behind, and thus, the timing of warning can be properly changed according to the degree of risk of the obstacle.

The threshold setting unit 52 may change the activation threshold for each of the ultrasonic obstacle detection sensors 13e to 13h according to the detection angle area GDC1, GDC2, GDL or GDR in which the obstacle is detected.

Description will be given with regard to the ultrasonic obstacle detection sensor 13e. If the ultrasonic obstacle detection sensor 13e does not detect the obstacle within a predetermined time before the vehicle 1 starts moving rearward, or if the distance to the obstacle detected by the ultrasonic obstacle detection sensor 13e varies by a predetermined distance (for example, 0.1 m) or more, the activation threshold of the ultrasonic obstacle detection sensor 13e is set to a larger one (or a maximum value) of the first threshold SV1 and the second threshold SV2. However, the second threshold SV2 may be selected only when the image obstacle detection unit 44 detects the obstacle in the left side detection angle area GDL. Then, if the ultrasonic obstacle detection sensor 13e detects the obstacle within the predetermined time before the vehicle 1 starts moving rearward and the distance to the obstacle detected by the ultrasonic obstacle detection sensor 13e does not vary by the predetermined distance (for example, 0.1 m) or more, or if the image obstacle detection unit 44 does not detect the obstacle in the left side detection angle area GDL, the first threshold SV1 may be selected as the activation threshold of the ultrasonic obstacle detection sensor 13e. If a parked or stopped vehicle or a curbstone or the like on the rear side of the vehicle 1 is detected as the obstacle, or if the image obstacle detection unit 44 does not detect the obstacle in the left side detection angle area GDL, the activation threshold of the ultrasonic obstacle detection sensor 13e can be changed according to the vehicle speed.

Description will be given with regard to the ultrasonic obstacle detection sensor 13f. If the ultrasonic obstacle detection sensor 13f does not detect the obstacle within a predetermined time before the vehicle 1 starts moving rearward, or if the distance to the obstacle detected by the ultrasonic obstacle detection sensor 13f varies by a predetermined distance (for example, 0.1 m) or more, the activation threshold of the ultrasonic obstacle detection sensor 13f is set to a maximum value of the first threshold SV1, the second threshold SV2, the third threshold SV3, and the fourth threshold SV4. However, the second threshold SV2 may be selected only when the image obstacle detection unit 44 detects the obstacle in the left side detection angle area GDL. The third threshold SV3 or the fourth threshold SV4 may be selected only when the image obstacle detection unit 44 detects the obstacle in the rear side detection angle area GDC1. Then, if the ultrasonic obstacle detection sensor 13f detects the obstacle within the predetermined time before the vehicle 1 starts moving rearward and the distance to the obstacle detected by the ultrasonic obstacle detection sensor 13f does not vary by the predetermined distance (for example, 0.1 m) or more, or if the image obstacle detection unit 44 does not detect the obstacle in the rear side detection angle area GDC1, the first threshold SV1 may be selected as the activation threshold of the ultrasonic obstacle detection sensor 13f.

Description will be given with regard to the ultrasonic obstacle detection sensor 13g. If the ultrasonic obstacle detection sensor 13g does not detect the obstacle within a predetermined time before the vehicle 1 starts moving rearward, or if the distance to the obstacle detected by the ultrasonic obstacle detection sensor 13g varies by a predetermined distance (for example, 0.1 m) or more, the activation threshold of the ultrasonic obstacle detection sensor 13g is set to a maximum value of the first threshold SV1, the second threshold SV2, the third threshold SV3, and the fourth threshold SV4. However, the second threshold SV2 may be selected only when the image obstacle detection unit 44 detects the obstacle in the right side detection angle area GDR. The third threshold SV3 or the fourth threshold SV4 may be selected only when the image obstacle detection unit 44 detects the obstacle in the rear side detection angle area GDC. Then, if the ultrasonic obstacle detection sensor 13g detects the obstacle within the predetermined time before the vehicle 1 starts moving rearward and the distance to the obstacle detected by the ultrasonic obstacle detection sensor 13g does not vary by the predetermined distance (for example, 0.1 m) or more, or if the image obstacle detection unit 44 does not detect the obstacle in the rear side detection angle area GDC2, the first threshold SV1 may be selected as the activation threshold of the ultrasonic obstacle detection sensor 13g.

Description will be given with regard to the ultrasonic obstacle detection sensor 13h. If the ultrasonic obstacle detection sensor 13h does not detect the obstacle within a predetermined time before the vehicle 1 starts moving rearward, or if the distance to the obstacle detected by the ultrasonic obstacle detection sensor 13h varies by a predetermined distance (for example, 0.1 m) or more, the activation threshold of the ultrasonic obstacle detection sensor 13h is set to a larger one (or a maximum value) of the first threshold SV1 and the second threshold SV2. However, the second threshold SV2 may be selected only when the image obstacle detection unit 44 detects the obstacle in the right side detection angle area GDR. Then, if the ultrasonic obstacle detection sensor 13h detects the obstacle within the predetermined time before the vehicle 1 starts moving rearward and the distance to the obstacle detected by the ultrasonic obstacle detection sensor 13h does not vary by the predetermined distance (for example, 0.1 m) or more, or if the image obstacle detection unit 44 does not detect the obstacle in the right side detection angle area GDR, the first threshold SV1 may be selected as the activation threshold of the ultrasonic obstacle detection sensor 13h.

As described above, the activation threshold is changed for each of the ultrasonic obstacle detection sensors 13e to 13h according to the detection angle area GDL, GDC1, GDC2, GDR in which the obstacle is detected, and thereby, the timing of warning can be properly changed for each of the ultrasonic obstacle detection sensors 13e to 13h according to the direction of detection of the obstacle.

Also, the threshold setting unit 52 may set a larger value for the activation threshold of each of the ultrasonic obstacle detection sensors 13e to 13h having the ultrasonic detection ranges CRL, CNL, CNR, CRR overlapping the detection angle area GDL, GDC1, GDC2, or GDR in which the obstacle is detected, than a value for the activation threshold of each of the ultrasonic obstacle detection sensors 13e to 13h having the ultrasonic detection ranges CRL, CNL, CNR, CRR which do not overlap the detection angle area. Thereby, the timing of warning can be advanced according to the direction of detection of the obstacle.

Further, the second threshold SV2 may be set equal to or more than the fourth threshold SV4, and the fourth threshold SV4 may be set equal to or more than the third threshold SV3. Thereby, an obstacle approaching the vehicle 1 from the lateral side of the vehicle 1 is judged to have a higher degree of risk than that of an obstacle approaching the vehicle 1 from just behind the vehicle 1, so that the timing of warning for the former can become earlier than that for the latter.

Figure 9:
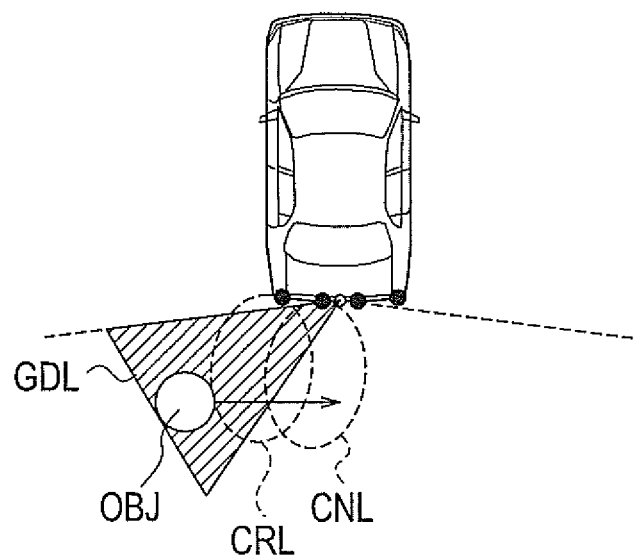
FIG. 9 is a plan view illustrating a case where the image obstacle detection unit 44 detects an obstacle OBJ in the left side detection angle area GDL.

If the image obstacle detection unit 44 detects an obstacle OBJ in the left side detection angle area GDL as illustrated in FIG. 9, the constant values (or the second to fourth thresholds) not depending on the vehicle speed may be selected as the activation thresholds of the ultrasonic obstacle detection sensors 13e (CRL) and 13f (CNL).

Figure 10:
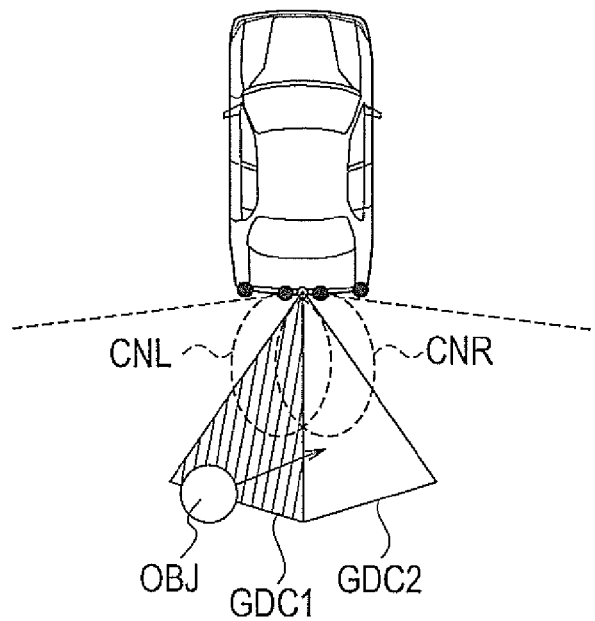
FIG. 10 is a plan view illustrating a case where the image obstacle detection unit 44 detects the obstacle OBJ in the rear side detection angle area GDC1 or GDC2.

If the image obstacle detection unit 44 detects the obstacle OBJ in the rear side detection angle area GDC1 or GDC2 as illustrated in FIG. 10, the constant values (or the second to fourth thresholds) not depending on the vehicle speed may be selected as the activation thresholds of the ultrasonic obstacle detection sensors 13f (CNL) and 13g (CNR).

Figure 11:
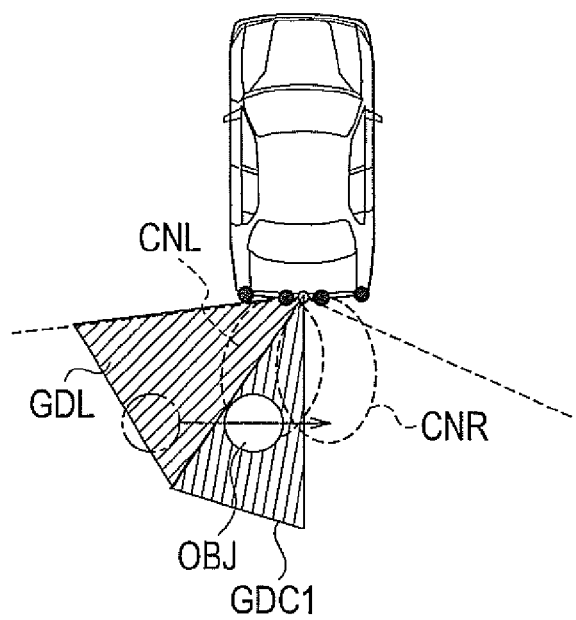
FIG. 11 is a plan view illustrating a case where, within a predetermined time, the image obstacle detection unit 44 detects the obstacle OBJ in the left side detection angle area GDL and detects the obstacle OBJ in the rear side detection angle area GDC1.

If, within a predetermined time, the image obstacle detection unit 44 detects the obstacle OBJ in the left side detection angle area GDL and detects the obstacle OBJ in the rear side detection angle area GDC1 as illustrated in FIG. 11, the constant values (or the second to fourth thresholds) not depending on the vehicle speed may be selected as the activation thresholds of the ultrasonic obstacle detection sensors 13f (CNL) and 13g (CNR). The same goes for a case where, within a predetermined time, the image obstacle detection unit 44 detects the obstacle OBJ in the right side detection angle area GDR and detects the obstacle OBJ in the rear side detection angle area GDC2.

The selected activation threshold of each of the ultrasonic obstacle detection sensors 13e to 13h is transmitted to the braking control decision unit 25, the accelerator pedal manipulation reaction force decision unit 28, the alarm decision unit 31, and the driving force control decision unit 34, which act as warning control units. The braking control decision unit 25, the accelerator pedal manipulation reaction force decision unit 28, the alarm decision unit 31 and the driving force control decision unit 34 calculate the activation threshold for each warning control by varying weights for each warning control. For example, the following relationship is established: $R1\_K1 \leq R1\_K2 \leq R1\_K4 \leq R1\_K3$. This enables weighting such that alarm, driving force control, accelerator pedal manipulation reaction force control, and braking control are activated in this order.

The braking control decision unit 25 determines to generate a braking force as a warning of the approach of the obstacle, when a condition A01 given below is established. It is to be here noted that the distance to the obstacle detected by the ultrasonic obstacle detection sensors 13e to 13h is referred to as an "ultrasonic sensor detected distance." The activation threshold multiplied by a coefficient R1_K1 for braking control is referred to as the activation threshold for braking.

A01: the activation threshold for braking>the ultrasonic sensor detected distance When the braking control decision unit 25 determines to activate warning by braking, the braking control unit 26 increases a brake pressure at a predetermined rate of change, and then, when a predetermined target brake pressure is reached, the braking control unit 26 maintains the brake pressure as it is. When hold time reaches a predetermined time (for example, 0.8 seconds), or when a predetermined time elapses after the vehicle speed has become equal to 0, the brake pressure is reduced to 0 at a predetermined rate of change. Incidentally, the predetermined rate of change and the predetermined target brake pressure may both be changed according to the vehicle speed or the distance to the obstacle. The braking force generation device 27 controls actual brake pressures on the wheels 20a to 20d so as to achieve the target brake pressure calculated by the braking control unit 26

The accelerator pedal manipulation reaction force decision unit 28 determines to generate an accelerator pedal manipulation reaction force to give the warning of the approach of the obstacle, when conditions A04 described below is established. It is to be here noted that the activation threshold obtained by multiplying its base value by the coefficient R1_K2 for the accelerator pedal manipulation reaction force is referred to as the activation threshold for APD.

A04: the activation threshold for APD>the ultrasonic sensor detected distance

When the accelerator pedal manipulation reaction force decision unit 28 determines to generate the accelerator pedal manipulation reaction force, the accelerator pedal manipulation reaction force control unit 29 increases a reaction force command value at a predetermined rate of change, and then, when a predetermined reaction force command value is reached, the accelerator pedal manipulation reaction force control unit 29 maintains the reaction force command value as it is. When hold time reaches a predetermined time (for example, 0.8 seconds), the reaction force command value is reduced to 0 at a predetermined rate of change. Incidentally, the predetermined rate of change and the predetermined reaction force command value may both be changed according to the vehicle speed or the distance to the obstacle. The accelerator pedal manipulation reaction force generation device 30 controls the manipulation reaction force of the accelerator pedal so as to achieve the reaction force command value calculated by the accelerator pedal manipulation reaction force control unit 29.

The alarm decision unit 31 determines to give an alarm by a sound or a buzzer or the like to give the warning of the approach of the obstacle, when condition A07 described below is established. It is to be here noted that the activation threshold obtained by multiplying its base value by the coefficient R1_K3 for the alarm is referred to as the activation threshold for alarm.

A07: the activation threshold for alarm>the ultrasonic sensor detected distance

When the alarm decision unit 31 determines to give the alarm, the alarm control unit 32 repeatedly turns on and off a buzzer driving signal for a predetermined time. The alarm device 33 gives the alarm based on the buzzer driving signal calculated by the alarm control unit 32. For example, a predetermined beep is repeatedly emitted. Alternatively, the alarm may be continuously sounded while the above-described condition is satisfied. Further, simultaneously with the alarm, a light emitter such as an indicator installed in a meter may flash on and off.

The driving force control decision unit 34 determines to perform the driving force control to give the warning of the approach of the obstacle, when condition A10 described below is established. It is to be here noted that the activation threshold obtained by multiplying its base value by the coefficient R1_K4 for the driving force is referred to as the activation threshold for driving force.

A10: the activation threshold for driving force>the ultrasonic sensor detected distance When the driving force control decision unit 34 determines to perform the driving force control, the driving force control unit 35 increases the amount of reduction in the accelerator opening at a predetermined rate of change. When the amount of reduction in the accelerator opening reaches a predetermined value, the amount of reduction is maintained as it is. When the amount of reduction is maintained for a predetermined time, the amount of reduction in the accelerator opening is reduced to 0. The final throttle opening of the engine has a value obtained by subtracting the amount of reduction in the accelerator opening calculated by the driving force control unit 35 from the accelerator opening operated by the driver. Incidentally, the predetermined rate of change and the predetermined value of the amount of reduction in the accelerator opening may both be changed according to the vehicle speed or the distance to the obstacle. The driving force generation device 36 controls engine power based on the final throttle opening of the engine calculated by the driving force control unit 35.

Figure 2:
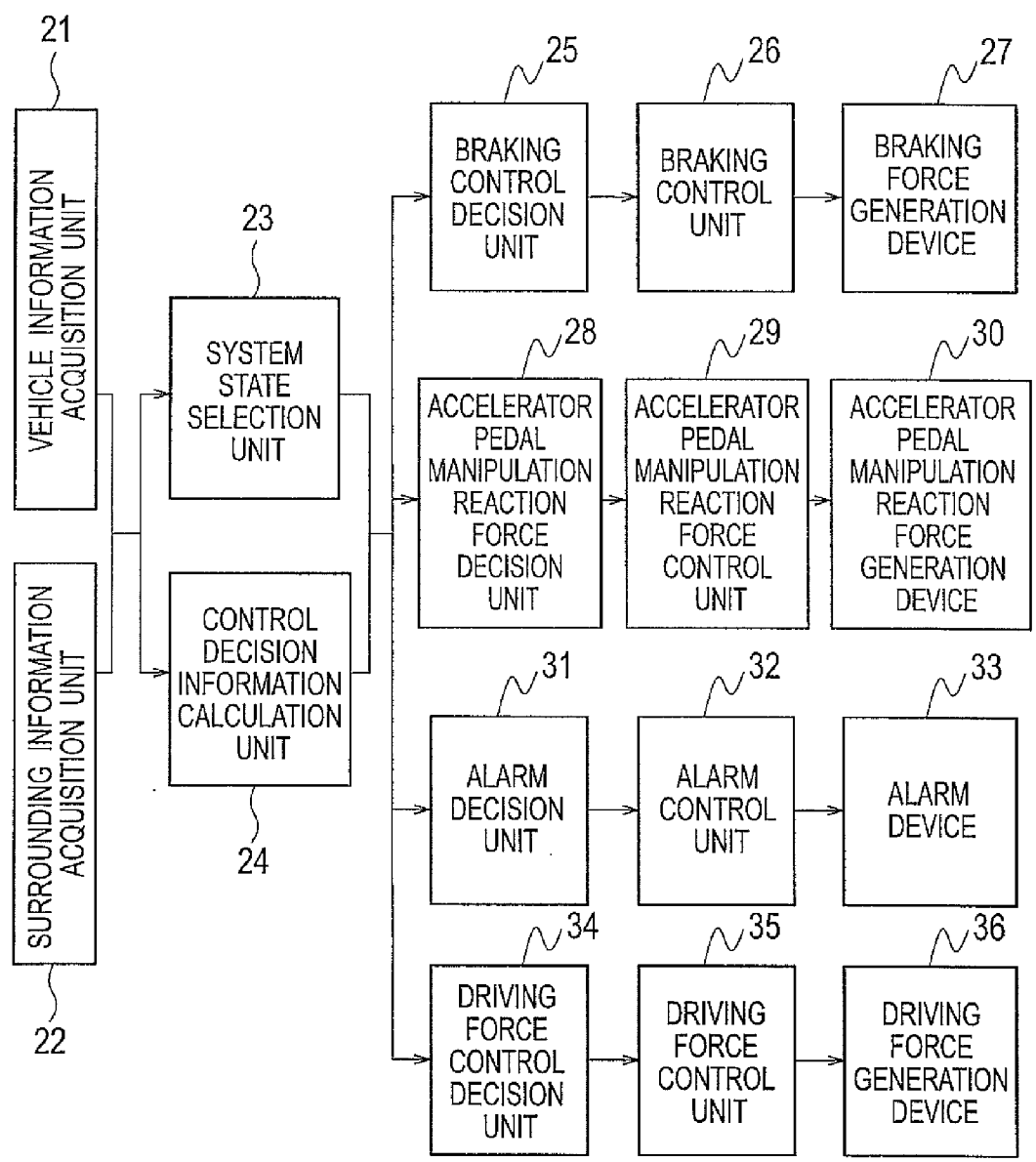
FIG. 2 is a block diagram illustrating a configuration of the travel control device according to the embodiment.

Incidentally, the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35, illustrated in FIG. 2 can be configured as a portion of the vehicle control device 2 of FIG. 1. Of course, a processing unit which is different from the vehicle control device 2 is prepared, and a CPU in the processing unit executes a previously stored computer program. This may implement operation of the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35.

At the time of rearward movement of the vehicle 1, a control unit of the travel control device having the above-described configuration executes travel control operation described below, thereby enabling properly timed warning about an obstacle detected by the ultrasonic obstacle detection sensors 13e to 13h or the image obstacle detection unit 44. Description will be given below with reference to a flowchart of FIG. 12 with regard to how the travel control device operates when executing the travel control operation.

Figure 12:
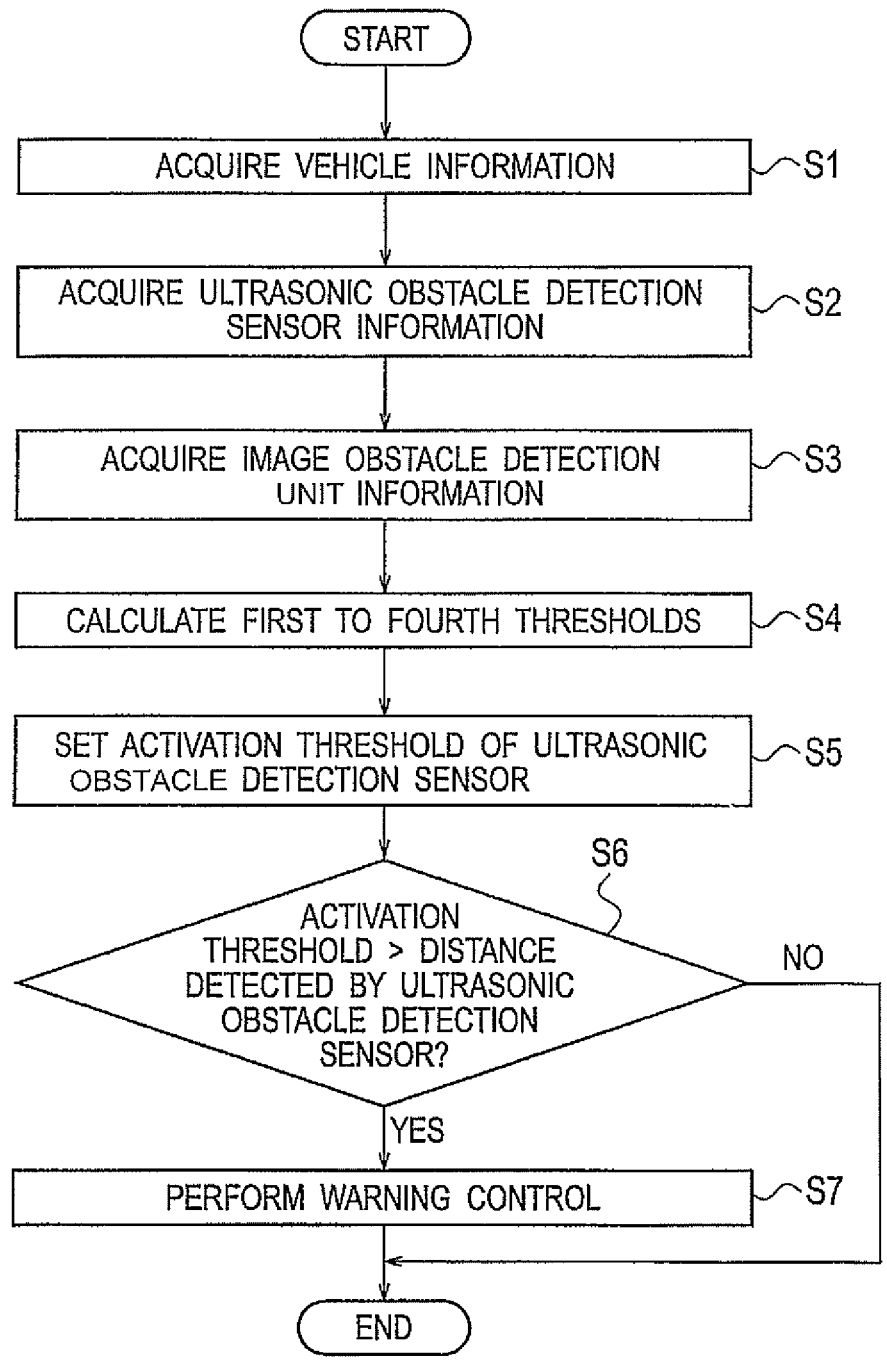
FIG. 12 is a flowchart illustrating how the travel control device operates when executing travel control operation.

The flowchart of FIG. 12 starts at the time when the system state selection unit 23 determines that the on-off switch for the travel control device is in the on state and the shift position detection unit 9 determines that the shift position of the vehicle 1 is located in the R (rearward movement) position, and the travel control operation goes to step S1 to perform processing. Then, the travel control operation is repeatedly executed so long as the on-off switch for the travel control device is in the on state and the shift position of the vehicle 1 is located in the R position. Also, the timing of start of the travel control operation is not limited to the above-described condition; besides the above-described condition, a condition such for example as where the vehicle speed is equal to or less than a predetermined value or the steering angle of the steering wheel is equal to or less than a predetermined value may be added.

In processing of step S1, the vehicle information acquisition unit 21 acquires the wheel speed of the vehicle 1, the accelerator opening, the position of the brake pedal, the shift position, the state of the on-off switch for the travel control device, the steering angle of the steering wheel and the acceleration or deceleration, as the vehicle information.

In processing of step S2, the surrounding information acquisition unit 22 acquires results detected by the ultrasonic obstacle detection sensors 13e to 13h, specifically, the presence or absence of the obstacle and the distance to the obstacle. In processing of step S3, the surrounding information acquisition unit 22 acquires a result detected by the image obstacle detection unit 44, specifically, the presence or absence of the obstacle. At step S2 or S3, besides, the presence or absence of an obstacle at each of the front side PD, the rear side and the lateral sides of the vehicle 1, the distance to the obstacle and the speed relative to the obstacle, and the approach time and the direction or angle of detection of the obstacle to be described later may be acquired as the surrounding information.

In processing of step S4, the first to fourth threshold calculation units 48 to 51 calculate the first to fourth thresholds SV1 to SV4, respectively. At step S5, the threshold setting unit 52 selects either the first threshold SV1, the second threshold SV2, the third threshold SV3, or the fourth threshold SV4, as the activation threshold.

In processing of step S6, the braking control decision unit 25, the accelerator pedal manipulation reaction force decision unit 28, the alarm decision unit 31 and the driving force control decision unit 34 calculate the activation threshold for each warning control by varying weights for each warning control. Then, the braking control decision unit 25, the accelerator pedal manipulation reaction force decision unit 28, the alarm decision unit 31 and the driving force control decision unit 34 determine whether or not to issue a warning of the approach of the obstacle in accordance with the above-described conditions A01, A04, A07, A010.

Specifically, each calculated activation threshold is compared to the distance to the obstacle acquired at step S2. If the distance to the obstacle is less than the activation threshold (YES at step S6), the operation goes to step S7 to issue the warning of the approach of the obstacle. Meanwhile, if the distance to the obstacle is equal to or more than the activation threshold (NO at step S6), the flow of FIG. 12 comes to an end without issuing the warning.

Description will be given with reference to FIGS. 13A-13C with regard to how an activation threshold SSV varies according to the detection state of the obstacle by the image obstacle detection unit 44, and decision on whether or not to issue a warning according to a result of comparison between the activation threshold SSV and a distance DOD to the obstacle. If the obstacle is not detected by the image obstacle detection unit 44, the activation threshold SSV is set to the first threshold SV1 regardless of whether or not the ultrasonic obstacle detection sensors 13e to 13h detect the obstacle. Therefore, the activation threshold SSV varies according to the vehicle speed. With the passage of time, the distance DOD to the obstacle becomes shorter, and the image obstacle detection unit 44 starts detecting the obstacle (at time t2). Then, the activation threshold SSV is set to any one of the second to fourth thresholds SV2 to SV4, which is a value other than the first threshold SV1 and is larger than the first threshold SV1. At time t3, the distance DOD to the obstacle becomes greater than the activation threshold SSV, and thus, a decision is made to issue the warning. If the obstacle is detected by the image obstacle detection unit 44, the timing of warning can be advanced from time t4 to the time t3 by changing the activation threshold.

According to the embodiment of the present invention, as described above, the following advantageous effects can be achieved.

If the shift position detection unit 9 determines that the shift position of the vehicle 1 is located in the R (rearward movement) position and the image obstacle detection unit 44 detects the obstacle, the degree of risk of the obstacle can be judged to be high. In this case, therefore, an alarm indicating the degree of risk of the obstacle can be given to the driver by changing the timing of warning according to the degree of risk of the obstacle by performing control to set the activation threshold to the constant value regardless of the vehicle speed of the vehicle 1.

The image obstacle detection unit 44 divides the range including the rear side of the vehicle 1 into the plural detection angle areas GDL, GDC1, GDC2, GDR, and detects the obstacle entering the rear side of the vehicle 1 for each of the detection angle areas GDL, GDC1, GDC2, GDR. The threshold setting unit 52 changes the activation threshold according to the detection angle area GDL, GDC1, GDC2, GDR in which the obstacle is detected. Thereby, the timing of warning can be changed according to the degree of risk of the obstacle by changing the degree of risk of the obstacle according to the direction of detection of the obstacle.

The image obstacle detection unit 44 divides the range into the plural detection angle areas GDL, GDC1, GDC2, GDR including, at least, the rear side detection angle areas GDC1, GDC2 including the rear side of the vehicle, and the left side detection angle area GDL and the right side detection angle area GDR adjacent to the rear side detection angle areas GDC1, GDC2, respectively, on both sides thereof. If the image obstacle detection unit 44 detects the obstacle in the left side detection angle area GDL or the right side detection angle area GDR, the threshold setting unit 52 sets the activation threshold larger than when the obstacle is detected in the rear side detection angle area GDC1 or GDC2. Thereby, the timing of warning can become earlier when the obstacle is detected on either of the left and right sides, than when the obstacle is detected just behind, and thus, the timing of warning can be properly changed according to the degree of risk of the obstacle.

The plural ultrasonic obstacle detection sensors 13e to 13h which detect the obstacle and the distance to the obstacle in the different ultrasonic detection ranges CRL, CNL, CNR, CRR, respectively, are provided. The threshold setting unit 52 changes the activation threshold for each of the ultrasonic obstacle detection sensors 13e to 13h according to the detection angle area GDL, GDC1, GDC2, GDR in which the obstacle is detected. Thereby, the timing of warning can be properly changed for each of the ultrasonic obstacle detection sensors 13e to 13h according to the direction of detection of the obstacle.

The threshold setting unit 52 sets a larger value for the activation threshold of each of the ultrasonic obstacle detection sensors 13e to 13h having the ultrasonic detection ranges CRL, CNL, CNR, CRR overlapping the detection angle area GDL, GDC1, GDC2, GDR in which the obstacle is detected, than a value for the activation threshold of each of the ultrasonic obstacle detection sensors 13e to 13h having the ultrasonic detection ranges CRL, CNL, CNR, CRR which do not overlap the detection angle areas. Thereby, the timing of warning can be advanced according to the direction of detection of the obstacle.

Only when the ultrasonic obstacle detection sensors 13e to 13h do not detect the obstacle within the predetermined time before the vehicle 1 starts moving rearward, or only when the distance to the obstacle detected by the ultrasonic obstacle detection sensors 13e to 13h varies, the threshold setting unit 52 performs control to set the activation threshold to the constant value regardless of the vehicle speed of the vehicle 1. Only when the obstacle enters after the start of rearward movement or the obstacle is a mobile unit, the activation threshold is controlled and set to the constant value, and thereby, for an adjacent parked vehicle or wall or the like, the activation threshold can be controlled according to the vehicle speed, and thus, the timing of warning can be properly changed according to the degree of risk of the obstacle.

While the contents of the present invention have been described above with reference to the embodiment and examples, it is to be understood that the present invention is not limited to these descriptions, and it would be obvious to one of ordinary skill in the art that various modifications and improvements could be made thereto.

According to the travel control device and travel control method according to the embodiment, it is possible to give a driver an alarm indicating the degree of risk of an obstacle, by changing the timing of warning according to the degree of risk of the obstacle. Therefore, the present invention has industrial applicability.

The invention claimed is:

1. A travel control device comprising:
an ultrasonic obstacle detection unit which detects an obstacle entering a rear side of a vehicle and a distance to the obstacle by using ultrasonic waves;
an image capture unit which captures an image of a range including the rear side of the vehicle;
an image obstacle detection unit which detects the obstacle entering the rear side of the vehicle by using the image captured by the image capture unit;
a rearward movement preparation detector which detects the vehicle preparing to move rearward by detecting a shift position of a transmission in the vehicle;
a warning device which issues a warning about the obstacle detected by the ultrasonic obstacle detection unit;
a warning control unit which controls the warning device so that the warning is issued if the distance to the obstacle detected by the ultrasonic obstacle detection unit is equal to or less than an activation threshold for warning; and
a threshold control unit which controls the activation threshold according to the vehicle speed of the vehicle so that the higher the vehicle speed of the vehicle, the larger the activation threshold, except when the rearward movement preparation detector detects the vehicle preparing to move rearward and the image obstacle detection unit detects the obstacle,
wherein, if the rearward movement preparation detector detects the vehicle preparing to move rearward and the image obstacle detection unit detects the obstacle, the threshold control unit performs control to set the activation threshold to a constant value regardless of the vehicle speed of the vehicle so as to issue the warning rather than issuing the warning when controlling the activation threshold according to the vehicle speed of the vehicle.

2. The travel control device according to claim 1, wherein the image obstacle detection unit divides the range including the rear side of the vehicle into a plurality of detection angle areas and detects the obstacle entering the rear side of the vehicle for each of the detection angle areas, and,
if the rearward movement preparation detector detects the vehicle preparing to move rearward and the image obstacle detection unit detects the obstacle, the threshold control unit changes the activation threshold according to the detection angle area in which the obstacle is detected.

3. The travel control device according to claim 2, wherein the image obstacle detection unit divides the range into the plurality of detection angle areas at least including a rear side detection angle area including the rear side of the vehicle, and a left side detection angle area and a right side detection angle area adjacent to the rear side detection angle area on both sides thereof, and,
if the image obstacle detection unit detects the obstacle in the left side detection angle area or the right side detection angle area, the threshold control unit sets the activation threshold larger than when the obstacle is detected in the rear side detection angle area.

4. The travel control device according to claim 2, wherein the ultrasonic obstacle detection unit includes a plurality of ultrasonic obstacle detection sensors which detect an obstacle and a distance to the obstacle in respectively different ultrasonic detection ranges, and
the threshold control unit changes the activation threshold for each of the ultrasonic obstacle detection sensors according to the detection angle area in which the obstacle is detected.

5. The travel control device according to claim 4, wherein the threshold control unit sets a larger value for the activation threshold of the ultrasonic obstacle detection sensor having the ultrasonic detection range overlapping the detection angle area in which the obstacle is detected, than a value for the activation threshold of the ultrasonic obstacle detection sensor having the ultrasonic detection range which does not overlap the detection angle area.

6. The travel control device according to claim 1, wherein, only when the ultrasonic obstacle detection unit does not detect the obstacle within a predetermined time before the vehicle starts moving rearward, or only when the distance to the obstacle detected by the ultrasonic obstacle detection unit varies, the threshold control unit performs control to set the activation threshold to the constant value regardless of the vehicle speed of the vehicle so as to issue the warning rather than issuing the warning when controlling the activation threshold according to the vehicle speed of the vehicle.

7. A travel control method using a travel control device including: an ultrasonic obstacle detection unit which detects an obstacle entering a rear side of a vehicle and a distance to the obstacle by using ultrasonic waves; an image capture unit which captures an image of a range including the rear side of the vehicle; an image obstacle detection unit which detects the obstacle entering the rear side of the vehicle by using the image captured by the image capture unit; a rearward movement preparation detector which detects the vehicle preparing to move rearward by detecting a shift position of a transmission in the vehicle; and a warning device which issues a warning about the obstacle detected by the ultrasonic obstacle detection unit, the method comprising:
controlling the warning device so that the warning is issued if the distance to the obstacle detected by the ultrasonic obstacle detection unit is equal to or less than an activation threshold for warning;
controlling the activation threshold according to the vehicle speed of the vehicle so that the higher the vehicle speed of the vehicle, the larger the activation threshold, except when the rearward movement preparation detector detects the vehicle preparing to move rearward and the image obstacle detection unit detects the obstacle; and performing control to set the activation threshold to a constant value regardless of the vehicle speed of the vehicle so as to issue the warning rather than issuing the warning when controlling the activation threshold according to the vehicle speed of the vehicle, if the rearward movement preparation detector detects the vehicle preparing to move rearward and the image obstacle detection unit detects the obstacle.

8. A travel control device comprising:

ultrasonic obstacle detecting means for detecting an obstacle entering a rear side of a vehicle and a distance to the obstacle by using ultrasonic waves;

image capturing means for capturing an image of a range including the rear side of the vehicle;

image obstacle detecting means for detecting the obstacle entering the rear side of the vehicle by using the image captured by the image capturing means;

rearward movement preparation detecting means for detecting the vehicle preparing to move rearward;

warning means for issuing a warning about the obstacle detected by the ultrasonic obstacle detecting means;

warning controlling means for controlling the warning means so that the warning is issued if the distance to the obstacle detected by the ultrasonic obstacle detecting means is equal to or less than an activation threshold for warning; and threshold controlling means for controlling the activation threshold according to the vehicle speed of the vehicle so that the higher the vehicle speed of the vehicle, the larger the activation threshold, except when the rearward movement preparation detector detects the vehicle preparing to move rearward and the image obstacle detection unit detects the obstacle, wherein, if the rearward movement preparation detecting means detect the vehicle preparing to move rearward and the image obstacle detecting means detect the obstacle, the threshold controlling means perform control to set the activation threshold to a constant value regardless of the vehicle speed of the vehicle so as to issue the warning rather than issuing the warning when controlling the activation threshold according to the vehicle speed of the vehicle.

\* \* \* \* \*